(12) United States Patent
Matsumoto et al.

(10) Patent No.: US 9,077,431 B2
(45) Date of Patent: Jul. 7, 2015

(54) RELAY DEVICE

(75) Inventors: Tadashi Matsumoto, Osaka (JP); Takeshi Sugiyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 171 days.

(21) Appl. No.: 13/991,784

(22) PCT Filed: Dec. 21, 2011

(86) PCT No.: PCT/JP2011/079704
§ 371 (c)(1),
(2), (4) Date: Jun. 5, 2013

(87) PCT Pub. No.: WO2012/086714
PCT Pub. Date: Jun. 28, 2012

(65) Prior Publication Data
US 2013/0250846 A1    Sep. 26, 2013

(30) Foreign Application Priority Data
Dec. 21, 2010 (JP) ................................. 2010-284010

(51) Int. Cl.
*H04B 7/26* (2006.01)
*H04W 88/04* (2009.01)
*H04W 80/04* (2009.01)
(Continued)

(52) U.S. Cl.
CPC .......... *H04B 7/2606* (2013.01); *H04B 7/15564* (2013.01)

(58) Field of Classification Search
CPC .... H04B 7/2606; H04W 88/04; H04W 80/04; H04W 88/06

USPC ................................................... 370/315, 328
See application file for complete search history.

(56) References Cited

U.S. PATENT DOCUMENTS

2009/0207776 A1    8/2009   Baik et al.

FOREIGN PATENT DOCUMENTS

| CN | 101438509 A | 5/2009 |
| JP | 54-40303 B | 12/1979 |
| JP | 54-40304 B | 12/1979 |

(Continued)

OTHER PUBLICATIONS

International Search Report for Corresponding International Application No. PCT/JP2011/079704 mailed Jan. 31, 2012.
(Continued)

*Primary Examiner* — Ronald B Abelson
(74) *Attorney, Agent, or Firm* — Renner, Otto, Boisselle & Sklar, LLP

(57) ABSTRACT

The relay device includes a first switch interposed between a first extraction unit and a second superimposing unit and a second switch interposed between a second extraction unit and a first superimposing unit. The first switch opens and closes a path where a superimposed signal is relayed from a first transmission path to a second transmission path. The second switch opens and closes a path where a superimposed signal is relayed from the second transmission path to the first transmission path. The first switch is controlled in response to reception of a first control signal to be turned off when a superimposed signal is relayed from the second transmission path to the first transmission path. The second switch is controlled in response to reception of a second control signal to be turned off when a superimposed signal is relayed from the first transmission path to the second transmission path.

5 Claims, 10 Drawing Sheets

(51) Int. Cl.
*H04W 88/06* (2009.01)
*H04B 7/155* (2006.01)

(56) References Cited

FOREIGN PATENT DOCUMENTS

| JP | 57-37264 B | 8/1982 |
|----|------------|--------|
| JP | 05-336006 A | 12/1993 |
| JP | 06-104798 A | 4/1994 |
| JP | 2009-225328 A | 10/2009 |

OTHER PUBLICATIONS

Form PCT/ISA/237 for Corresponding International Application No. PCT/JP2011/079704 mailed May 7, 2012.

Chinese Office Action for Corresponding Chinese Application No. 201180062226.9 dated Jan. 28, 2015.

RELAY DEVICE

TECHNICAL FIELD

The present invention relates to a relay device which is used in a communication system allowing communication by use of a first communication signal and a second communication signal superimposed on the first communication signal and is configured to relay the second communication signal between different transmission paths.

BACKGROUND ART

In the past, a communication system in which a transmission unit (master) and communication terminals (slaves) are connected to a transmission path and the respective communication terminals communicate with the transmission unit has become popular. As an instance of such a communication system, there has been proposed a system in which the transmission unit periodically monitors states of the respective communication terminals. In this system, upon acknowledging a change in a state of one communication terminal, the transmission unit sends a signal to another communication terminal to perform a processing corresponding to the change in the state (see patent documents 1 to 3).

However, in the communication with the above configuration, the communication terminals consistently communicate with each other through the transmission unit, and the transmission unit polls the communication terminals. Thus, a communication speed is relatively low. For example, this communication system is unsuitable for transmitting information with a relatively large data amount such as an analog quantity. Moreover, as for the aforementioned communication system, when the transmission unit malfunctions, the whole system halts. Hence, the communication system has low system reliability.

In view of this, there has been proposed a communication system designed as a hybrid of an existing communication system designed to allow communication terminals to communicate with each other through a transmission unit and a communication system designed to allow communication terminals to directly communicate with each other via peer-to-peer (P2P). In this hybrid communication system, a transmission path is shared by a first communication terminal communicating with the transmission unit and second communication terminals directly communicating with each other. Thus, the second communication terminal can be easily added on the existing communication system. The first communication terminal performs communication using a first communication signal (first protocol signal) which is repeatedly sent from the transmission unit, and the second communication terminal performs communication using a second communication signal (second protocol signal) which is superimposed on the first communication signal.

As for a general communication system, to extend the transmission path or to increase the number of terminals connected to the transmission path, relays are interposed between plural transmission paths. For example, a first transmission path and a second transmission path are connected to each other via a relay, and the relay relays a signal inputted from one transmission path of the first transmission path and the second transmission path to the other transmission path.

As for the communication system using the first communication signal and the second communication signal, with connecting a relay device for relaying the second communication signal in parallel with the relay in addition to provision of the relay for relaying the first communication signal, the first communication signal and the second communication signal can be relayed (see patent document 4). This relay device includes an extraction unit (extracting means) for extracting the second communication signal from a signal transmitted through one transmission path, a shaping unit (shaping means) for performing waveform shaping on this second communication signal, and a superimposing unit (superimposing means) for superimposing the second communication signal on the first communication signal on the other transmission path to send the second communication signal to the other transmission path.

Further, patent document 4 discloses that, to enable relaying the second communication signal from the first transmission path to the second transmission path and relaying the second communication signal from the second transmission path to the first transmission path, each of pairs of the extraction units, the shaping units, and the superimposing units is provided.

CITATION LIST

Patent Literature

Patent Document 1 Japanese Patent No. 1180690
Patent Document 2 Japanese Patent No. 1195362
Patent Document 3 Japanese Patent No. 1144477
Patent Document 4 Japanese Unexamined Patent Application Publication No. 2009-225328

SUMMARY OF INVENTION

Technical Problem

However, in the aforementioned relay device, when the second communication signal extracted from one transmission path is relayed to the other transmission path, the second communication signal is likely to be fed back from the transmission path designated as a relaying destination to the transmission path designated as a relaying source. Hence, to use the relay device enabling bidirectional relaying the second communication signal between the first transmission path and the second transmission path may cause a loop phenomenon in which the second communication signal is relayed from the first transmission path to the second transmission path and is thereafter returned from the second transmission path to the first transmission path. Consequently, with regard to the respective transmission paths designated as the relaying source and the relaying destination, waveforms of the second communication signals are likely to be interfered (overlapped) with each other. Hence, there may be a problem that the relay device fails to relay the second communication signal without causing a distortion in the waveform of the second communication signal.

In view of the above insufficiency, the present invention has aimed to propose a relay device capable of preventing feedback of the second communication signal from the transmission path designated as a relaying destination to the transmission path designated as a relaying source, and of relaying the second communication signal without causing a distortion in a waveform of the second communication signal.

Solution to Problem

The relay device in accordance with the present invention is interposed between a first transmission path and a second transmission path and is used in a communication system allowing communication by use of a first communication signal and a second communication signal superimposed on the first communication signal which are transmitted through the first transmission path and the second transmission path. The relay device includes a first extraction unit, a first shaping unit, a second superimposing unit, a second extraction unit, a second shaping unit, and a first superimposing unit. The first extraction unit is configured to extract the second communication signal from a signal transmitted through the first transmission path. The first shaping unit is configured to subject the second communication signal extracted by the first extraction unit, to shaping. The second superimposing unit is configured to superimpose the second communication signal subjected to shaping by the first shaping unit, on the first communication signal on the second transmission path, to send the second communication signal to the second transmission path. The second extraction unit is configured to extract the second communication signal from a signal transmitted through the second transmission path. The second shaping unit is configured to subject the second communication signal extracted by the second extraction unit, to shaping. The first superimposing unit is configured to superimpose the second communication signal subjected to shaping by the second shaping unit, on the first communication signal on the first transmission path, to send the second communication signal to the first transmission path. The relay device further includes a first switch and a second switch. The first switch is configured to open and close a connection between the first extraction unit and the second superimposing unit. The second switch is configured to open and close a connection between the second extraction unit and the first superimposing unit. The first switch is controlled by a first control signal to be turned off when the second communication signal is relayed from the second transmission path to the first transmission path. The second switch is controlled by a second control signal to be turned off when the second communication signal is relayed from the first transmission path to the second transmission path.

Preferably, the relay device further includes a first control unit and a second control unit. The first control unit is configured to generate the second control signal according to the second communication signal extracted by the first extraction unit. The second control unit is configured to generate the first control signal according to the second communication signal extracted by the second extraction unit.

Preferably, the relay device further includes a first judgment unit and a second judgment unit. The first judgment unit is configured to extract the first communication signal from a signal transmitted through the first transmission path and judge whether or not a current period is a superimposable period in which the second communication signal is allowed to be superimposed. The second judgment unit is configured to extract the first communication signal from a signal transmitted through the second transmission path and judge whether or not the current period is the superimposable period in which the second communication signal is allowed to be superimposed. The first control unit is configured to turn off the second switch by the second control signal only while the current period is determined to be the superimposable period by the first judgment unit. The second control unit is configured to turn off the first switch by the first control signal only while the current period is determined to be the superimposable period by the second judgment unit.

Preferably, in this relay device, the first control unit is configured to turn off the second switch by the second control signal only while the first switch is turned on. The second control unit is configured to turn off the first switch by the first control signal only while the second switch is turned on.

Preferably, the relay device further includes a first preprocessing unit and a second preprocessing unit. The first preprocessing unit is interposed between the first extraction unit and the first control unit and configured to subject the second communication signal to shaping. The second preprocessing unit is interposed between the second extraction unit and the second control unit and configured to subject the second communication signal to shaping.

Preferably, each of the first preprocessing unit and the second preprocessing unit is configured to generate a pulse signal with a fixed pulse width in response to a trigger defined by a variation in the second communication signal.

Advantageous Effects of Invention

According to the present invention, while the second communication signal is relayed from the second transmission path to the first transmission path, the first switch positioned between the first extraction unit and the second superimposing unit is turned off. While the second communication signal is relayed from the first transmission path to the second transmission path, the second switch positioned between the second extraction unit and the first superimposing unit is turned off. Consequently, the second communication signal is not fed back from the transmission path as the relaying destination to the transmission path as the relaying source. Hence, it is possible to relay the second communication signal without causing a distortion in the waveform thereof.

DESCRIPTION OF EMBODIMENTS

Figure 2:
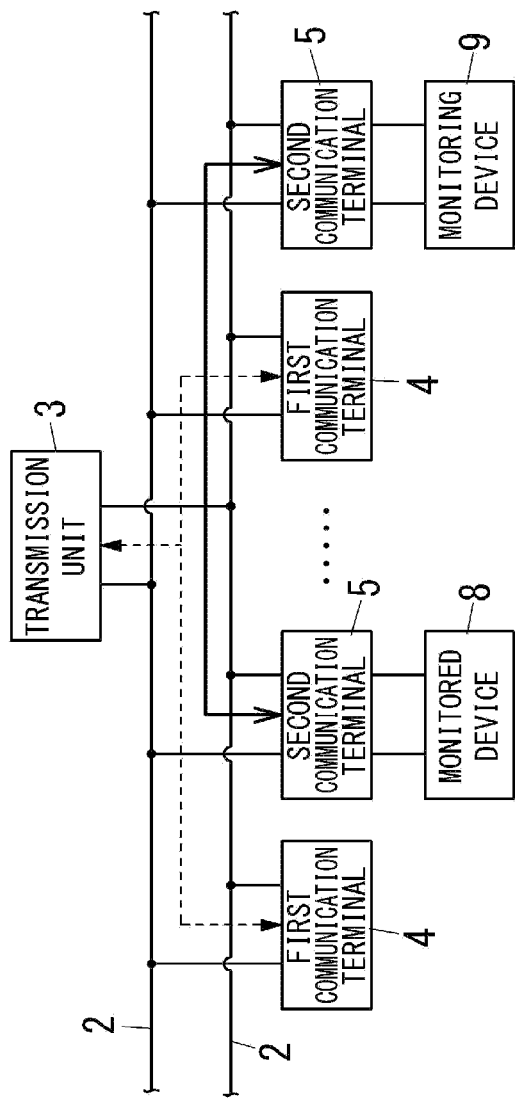
FIG. 2 is a schematic system configuration diagram illustrating the communication system in which the above relay device is used.

First, the following explanation is made to a basic configuration of a communication system employing relay devices in accordance with respective embodiments. As shown in FIG. 2, the communication system of the following embodiments is a communication system including a transmission unit 3 connected to a transmission path 2 constituted by two wires.

This communication system includes plural (two, in the illustrated instance) first communication terminals 4 connected to the transmission path 2 and configured to communicate with the transmission unit 3, and plural (two, in the illustrated instance) second communication terminals 5 connected to the transmission path 2 and configured to communicate with each other directly. In this communication system, communication is performed by use of a first communication signal (first protocol signal) transmitted through the transmission path 2 and a second communication signal (second protocol signal) superimposed on the first communication signal. The second communication has a frequency higher than that of the first communication signal. Interposed between the transmission unit 3 and the transmission path 2 is an impedance matching module 6 (see FIG. 1 (*a*)) for matching the impedance. Additionally, the impedance matching module 6 may be interposed between the transmission path 2 and each of the first communication terminals 4.

The plural first communication terminals 4 are connected in parallel with the transmission unit 3 via the transmission path 2. The transmission unit 3 and the first communication terminals 4 constitute a time-division multiplex communication system (hereinafter referred to as "base system") in which data transmission from the transmission unit 3 to the first communication terminal 4 and data transmission from the first communication terminal 4 to the transmission unit 3 are executed in a time-division manner.

In view of the base system, for example, the first communication terminal 4 is categorized into two kinds of devices including a monitoring terminal attached to a switch (not shown) or a sensor (not shown) and a control terminal attached to a load (not shown). Hence, it is possible to control a load attached to the control terminal in response to a monitoring input from a switch or a sensor attached to the monitoring terminal. Each of the first communication terminals 4 stores its own address preliminarily assigned thereto in a storage (not shown) thereof.

Upon receiving the monitoring input, the monitoring terminal transmits control information corresponding to the received monitoring input to the transmission unit 3. Upon receiving the control information, the transmission unit 3 transmits the control information to the control terminal which is associated with the monitoring terminal by use of the addresses. Upon receiving the control information, the control terminal controls the load in accordance with the control information received. Since, the control information reflects the monitoring input from a switch etc., the monitoring input from a switch etc., is reflected on the control of the load.

Figure 3:
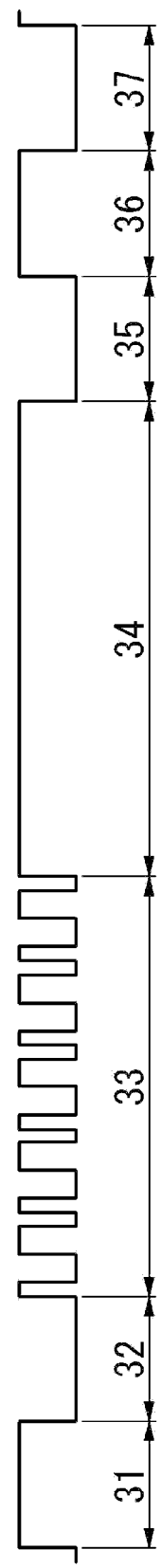
FIG. 3 is an explanation diagram illustrating a format of a transmission signal used in the above.

The transmission unit 3 sends, to the transmission path 2, the first communication signal (hereinafter referred to as "transmission signal") which has a voltage waveform as illustrated in FIG. 3. For example, the transmission signal is a time-division multiplex signal which is constituted by a preliminary interrupt period 31, a preliminary period 32, a transmission period 33, a return period 34, an interrupt period 35, a short-circuit detection period 36, and a rest period 37, and has two different states (±24 V). The preliminary interrupt period 31 serves as a period for detecting a secondary interrupt. The preliminary period 32 is a period in accordance with the interrupt period 35 and the short-circuit detection period 36. The transmission period 33 serves as a period for transmitting data to a first communication terminal 4. The return period 34 serves as a time slot for receiving a return signal from a first communication terminal 4. The interrupt period 35 serves as a period for detecting an interrupt signal mentioned below. The short-circuit detection period 36 serves as a period for detecting short-circuit. The rest period 37 serves as a period for compensating a delay in a processing. The transmission signal is a signal used for transmitting data by means of modulating a carrier constituted by a series of pulses.

Next, an explanation is made to an operation of the base system.

As for each of the first communication terminals 4, when address data included in the transmission period 33 of the transmission signal received via the transmission path 2 is identical to the address stored in the storage unit (not shown), the first communication terminal 4 retrieves the control information for controlling the load from the transmission signal. Further, the first communication terminal 4 returns the control information as a current mode signal, which is transmitted by means of short-circuiting the transmission path 2 via an appropriate low impedance element, in synchronization with the return period 34 of the transmission signal. Besides, the transmission signal transmitted via the transmission path 2 is rectified and stabilized and then is supplied, as electrical power, to an internal circuit of the first communication terminal 4.

The transmission unit 3 normally performs a constant polling process of accessing the first communication terminals 4 in turn by means of cyclically changing the address data included in the transmission signal. While the constant polling process is performed, when the transmission signal includes the control information, the first communication terminal 4 having the address identical to the address data included in the transmission signal acquires the control information and then operates, and returns its operation state to the transmission unit 3.

Further, upon receiving an interrupt signal generated by a monitoring terminal (first communication terminal 4) in response to a monitoring input from a switch etc., the transmission unit 3 searches for the first communication terminal 4 which has generated the interrupt signal, and accesses the detected first communication terminal 4 and also performs an interrupt polling process.

In brief, the transmission unit 3 normally sends the transmission signal having mode data representing a normal mode. Upon detecting the interrupt signal generated by the monitoring terminal (first communication terminal 4) in synchronization with the interrupt period 35 of the transmission signal, the transmission unit 3 sends the transmission signal having the mode data representing an interrupt polling mode.

When the first communication terminal 4 which has generated the interrupt signal acknowledges that its own address has the same high order bit as the address data of the received transmission signal of the interrupt polling mode, the first communication terminal 4 returns a low order bit of its own address as return data in synchronization with the return period 34 of the received transmission signal. Through this process, the transmission unit 3 can acquire the address of the first communication terminal 4 which has generated the interrupt signal.

Upon acquiring the address of the first communication terminal 4 having generated the interrupt signal, the transmission unit 3 sends the transmission signal for requesting return of the control information to this first communication terminal 4, and the first communication terminal 4 returns the control information corresponding to the monitoring input from the switch etc., to the transmission unit 3. Upon receiving the control information, the transmission unit 3 instructs the first communication terminal 4 to clear its monitoring input, and this first communication terminal 4 informs the transmission unit 3 that the monitoring input has cleared.

Upon receiving the control information, the transmission unit 3 creates the control information to be transmitted to the first communication terminal (control terminal) 4 associated, by a correspondence relation of the address, with the first communication terminal (monitoring terminal) 4 which is a sender of the control information. The transmission unit 3 sends the transmission signal including the newly created control information to the transmission path 2, thereby controlling the load attached to the first communication terminal (control terminal) 4.

As described above, in the base system, the first communication terminals (the monitoring terminal and the control terminal) 4 communicate with each other through the transmission unit 3 in accordance with a polling/selecting protocol (first protocol).

In the above communication system, while sharing the transmission path 2 with the base system, the plural second communication terminals 5 use the second communication signal (hereinafter referred to as "superimposed signal") superimposed on the transmission signal of the first protocol to communicate with each other. Some second communication terminals 5 are connected to monitored devices 8 configured to output monitoring information transmitted between the second communication terminals 5, and other second communication terminals 5 are connected to monitoring devices 9 configured to acquire the monitoring information from the second communication terminal 5. The monitored device 8 and the monitoring device 9 establish communication periodically, thereby sending data to and receiving data from the second communication terminal 5.

In brief, although a device for establishing the communication (data transmission) through the transmission path 2 is the second communication terminal 5, a device for creating data (monitoring information) to be transmitted is the monitored device 8 and a device for processing data received is the monitoring device 9. In this regard, the second communication terminal 5 serves as an adapter configured to establish communication by converting data from the monitored device 8 or the monitoring device 9 being connected thereto and sending the converted data to the transmission path 2. Note that, the monitored device 8 is, for example, a power meter designed to measure a power consumption of a lighting device to be controlled by the base system, and the monitoring device 9 is, for example, an indicator designed to display the power consumption measured by the power meter.

In accordance with the protocol (second protocol) different from the aforementioned first protocol, second communication terminal 5 can directly send the transmission data (monitoring information) to another second communication terminal 5 by means of a peer-to-peer (P2P) connection without passing through the transmission unit 3. Concretely, the second communication terminal 5 sends a packet including data to be transmitted to the other second communication terminal 5, in conformity with the second protocol, to the transmission path 2, and the other second communication terminal 5 receives the sent packet based on the second protocol. The packet based on the second protocol is superimposed on the transmission signal sent from the transmission unit 3. In brief, while the communication between the first communication terminals 4 based on the first protocol is performed by way of the transmission unit 3, the communication between the second communication terminals 5 based on the second protocol is directly performed between the communication terminals without passing through the transmission unit 3. Thus, the second protocol communication can have a high communication speed relative to the first protocol communication, and is used for transmission of data having relatively large data amount such as an analog quantity (e.g., power consumption).

Further, the second communication terminal 5 monitors the transmission signal of the first protocol transmitted between the transmission unit 3 and the first communication terminal 4 of the base system, and analyzes a data transmission condition (hereinafter referred to as "state") of the first protocol from the transmission signal. Further, the second communication terminal 5 has functions of judging whether or not the state is a condition suitable for transmitting a packet of the second protocol, and of sending the packet when determining that the state is the condition suitable for transmitting the packet.

As mentioned above, the transmission signal is based on a signal format as illustrated in FIG. 3. With regard to the preliminary interrupt period 31, the preliminary period 32, and the rest period 37, even if the superimposed signal is superimposed, the communication based on the first protocol is not affected. Further, the superimposed signal is insusceptible to the transmission signal. Thus, the preliminary interrupt period 31, the preliminary period 32, and the rest period 37 can be used as a period (hereinafter referred to as "superimposable period") in which the superimposed signal is allowed to be superimposed.

With regard to the other periods (the transmission period 33, the return period 34, the interrupt period 35, and the short-circuit detection period 36), since a period in which the transmission signal is stably kept at a high level or a low level is relatively short, the communication based on the first protocol is susceptible to the superimposition of the superimposed signal. When the superimposed signal is superimposed in the other period, the superimposed signal is susceptible to a signal (e.g., the interrupt signal and the return data) received and sent between the transmission unit 3 and the first communication terminal 4. Therefore, the other periods are considered as a period (hereinafter referred to as "unsuperimposable period") unusable for superimposition of the superimposed signal.

Moreover, periods of a rising edge and a falling edge of the transmission signal are not suitable for superimposition of the superimposed signal, because of influences of harmonic noises and a transient response accompanied with a voltage reversion of a signal. Therefore, a predetermined period (e.g., 300 μs) subsequent to transition between periods (the rising edge or the falling edge) included in each of the preliminary interrupt period 31, the preliminary period 32, and the rest period 37 of the transmission signal is also considered as the unsuperimposable period.

In view of the above, the second communication terminal 5 is configured to analyze the state of the transmission signal and judge whether the current period is (the transmission signal has) the superimposable period or the unsuperimposable period based on the analysis result (the state of the transmission signal), and, only when concluding that the current period is the superimposable period, send the superimposed signal. As mentioned above, the second communication terminal 5 superimposes the superimposed signal on the transmission signal only in the superimposable period in synchronization with the transmission signal, thereby avoiding interference between the first protocol communication and the second protocol communication sharing the common transmission path 2.

In the present embodiment, when the second communication terminal 5 fails to send the transmission data in one superimposable period due to a large data amount of the transmission data, the second communication terminal 5 temporarily terminates communication at the end of the current superimposable period and sends the remaining data in the next superimposable period.

Note that, like the first communication terminal 4 of the base system, power is supplied to respective units of the second communication terminal 5 by use of a system (centralized power supply system) of creating power by rectifying and stabilizing the transmission signal transmitted via the transmission path 2. However, a power supply system used in the present embodiment is not limited to this system. For example, power may be supplied to respective units of the second communication terminal 5 by use of a system (local power supply system) of creating power by rectifying and stabilizing power supplied from a commercial AC source.

First Embodiment

Figure 1:
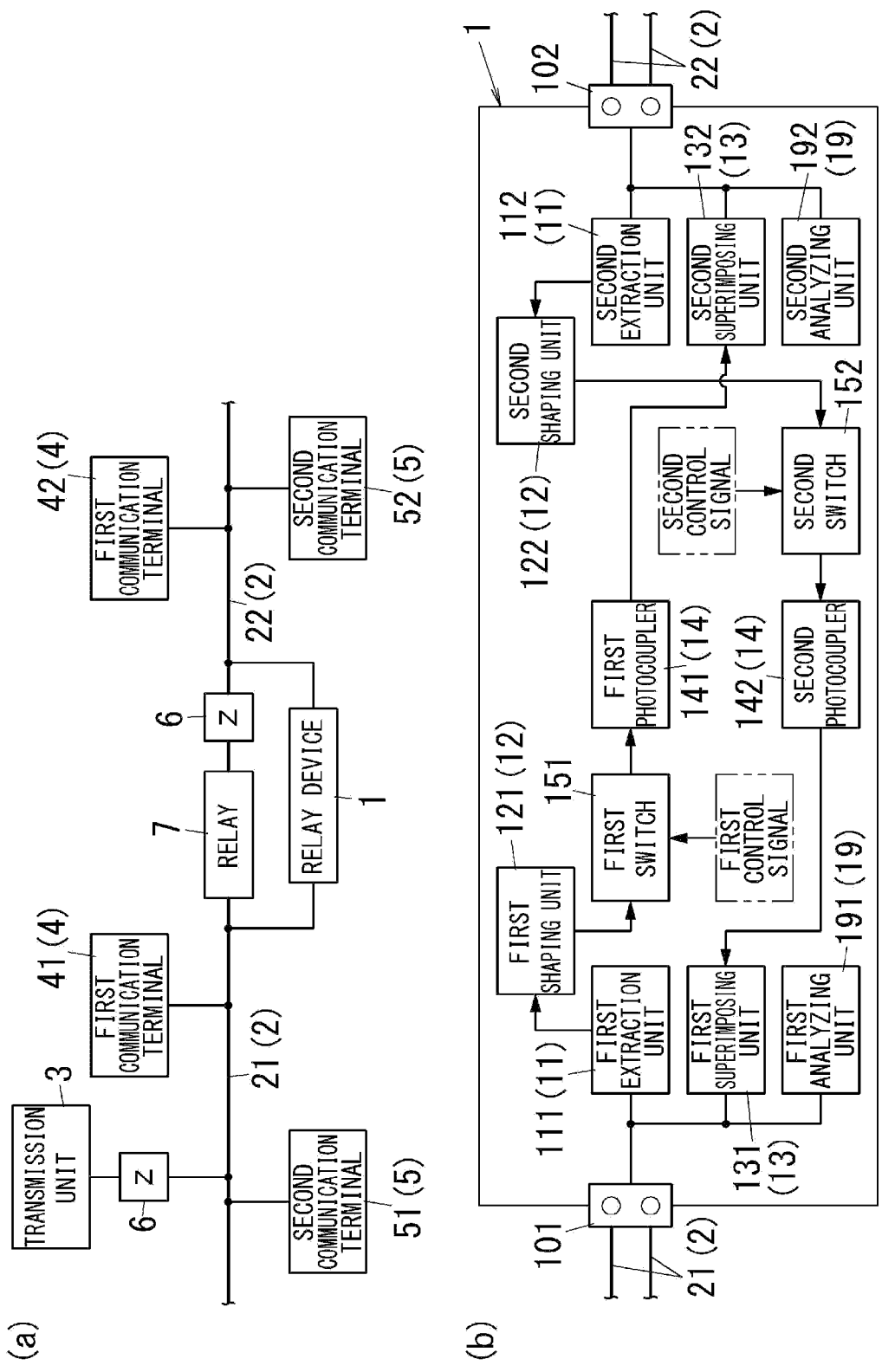
FIG. 1 relates to a configuration of the first embodiment and includes a schematic system configuration diagram (a) illustrating a communication system, and a schematic block diagram (b) illustrating a relay device.

As shown in FIG. 1 (a), when, in the communication system with the above configuration, a first transmission path 21 to which the transmission unit 3 is connected is connected to a second transmission path 22, a relay device 1 of the present embodiment is interposed between the first transmission path 21 and the second transmission path 22. In the following, when a distinction between the first transmission path 21 and the second transmission path 22 is deemed unnecessary, they are referred to as the transmission path 2.

In the instance shown in FIG. 1 (a), a first communication terminal 41 and a second communication terminal 51 are connected to the first transmission path 21 and a first communication terminal 42 and a second communication terminal 52 are connected to the second transmission path 22. In the following, when a distinction between the first communication terminals 41 and 42 is deemed unnecessary, they are referred to as the first communication terminal 4. Further, when a distinction between the second communication terminal 51 and the second communication terminal 52 is deemed unnecessary, they are referred to as the second communication terminal 5. Note that, although each of the second communication terminals 5 is connected to the monitored device 8 or the monitoring device 9, monitored devices and monitoring devices are not shown in FIG. 1 (a).

In the present embodiment, the second communication terminal 51 connected to the monitoring device 9 out of the second communication terminals 5 serves as a master, and the second communication terminal 52 connected to the monitored device 8 out of the second communication terminals 5 serves as a slave. In addition to the second communication terminal 52, a second communication terminal (not shown) which is connected to the monitored device 8 and serves as a slave may be connected to the transmission path 2. The second communication terminal 51 serving as the master sends the superimposed signal (second communication signal) periodically to the second communication terminal 52 serving as the slave in a polling manner. Consequently, the monitoring device 9 can periodically collect the monitoring information from the monitored device 8 as a response to polling.

In this regard, interposed between the first transmission path 21 and the second transmission path 22 is a relay 7 for relaying the transmission signal (first communication signal) based on the first protocol. The relay device 1 of the present embodiment is connected in parallel with the relay 7. The relay 7 includes an amplifier (not shown) configured to amplify the transmission signal and a filter (not shown) configured to extract the transmission signal. Even if the waveform of the transmission signal inputted from one of the transmission paths 2 is distorted due to attenuation and reflection, the relay 7 shapes (corrects) the transmission signal and relays it to the other of the transmission paths 2. The relay 7 is used for a case where the transmission path is extended or a case where the power supply performance of the transmission unit 3 becomes insufficient due to an increase in the number of communication terminals connected to the transmission path 2. Note that, the relay 7 outputs the transmission signal to the transmission path (the second transmission path 22 in FIG. 1 (a)) on a downstream side with regard to the transmission signal, in a similar manner as the transmission unit 3. Hence, the impedance matching module 6 is interposed between the relay 7 and the transmission path on the downstream side with regard to the transmission signal.

However, the relay 7 allows only the transmission signal based on the first protocol to pass, but the superimposed signal (second communication signal) based on the second protocol is not allowed to pass through the relay 7. Hence, to relay the superimposed signal between the first transmission path 21 and the second transmission path 22, the relay device 1 of the present embodiment is necessary.

As shown in FIG. 1 (b), the relay device 1 includes an extraction unit (extraction circuit) 11 configured to extract a superimposed signal from a signal transmitted through one of the transmission paths 2, a shaping unit (shaping circuit) 12 configured to shape (correct) a waveform of the superimposed signal extracted, and a superimposing unit (superimposing circuit) 13 configured to send the superimposed signal with the shaped waveform to the other of the transmission paths 2. The relay device 1 includes a first terminal 101 to be connected to the first transmission path 21 and a second terminal 102 to be connected to the second transmission path 22.

Further, the relay device 1 includes a photocoupler 14 for electrically insulating between the first transmission path 21 and the second transmission path 22. The photocoupler 14 is interposed between the shaping unit 12 and the superimposing unit 13. In the following explanation, a circuit of the relay device 1 located on a side close to the first transmission path 21 from the photocoupler 14 is referred as a "primary side" of the photocoupler 14, and a circuit of the relay device 1 located on a side close to the second transmission path 22 from the photocoupler 14 is referred as a "secondary side" of the photocoupler 14.

In the present embodiment, the shaping unit 12 includes an amplifier (not shown) configured to amplify a signal and a filter (not shown) configured to allow a signal with a predetermined frequency to pass. When a signal is attenuated due to an increase in the length of the transmission path or when a waveform of a signal is distorted due to reflection, the shaping unit 12 performs shaping on a waveform of a signal. Note that, preferably, the shaping unit 12 may be provided with a Schmitt circuit, and be configured to perform waveform shaping by use of the Schmitt circuit.

The superimposing unit 13 superimposes the superimposed signal subjected to shaping by the shaping unit 12 on the transmission signal on the transmission path 2 designated as a destination (hereinafter referred to as "relaying destination") for the superimposed signal to send this superimposed signal to the transmission path 2 designated as the relaying destination. Accordingly, the relay device 1 has a function of monitoring the transmission signal on the transmission path 2 designated as the relaying destination, and further includes an analyzing unit (analyzing circuit) 19 configured to analyze a data transmission condition (state) of the first protocol with regard to the transmission path 2 designated as the relaying destination. The superimposing unit 13 judges whether or not the analyzed state is in a condition suitable for transmission of the superimposed signal. The superimposing unit 13 sends the superimposed signal to the transmission path 2 designated as the relaying destination upon determining that the state is in the condition suitable for transmission of the superimposed signal. The timing at which the superimposing unit 13 sends the superimposed signal to the transmission path 2 designated as the relaying destination is determined such that the superimposed signal is superimposed on the transmission signal on the transmission path 2 designated as the relaying destination within the predetermined superimposable period.

In this regard, to enable relaying the extracted superimposed signal to the transmission path 2 designated as the relaying destination irrespective of whether an extraction source (hereinafter referred to as "relaying source") for the superimposed signal is the first transmission path 21 or the second transmission path 22, the relay device 1 of the present embodiment is designed as follows.

Accordingly, the extraction unit 11 includes a first extraction unit 111 and a second extraction unit 112. The first extraction unit 111 is connected to the first terminal 101 and is configured to extract the superimposed signal from a signal transmitted through the first transmission path 21. The second extraction unit 112 is connected to the second terminal 102 and is configured to extract the superimposed signal from a signal transmitted through the second transmission path 22. Further, the shaping unit 12 includes a first shaping unit 121 and a second shaping unit 122. The first shaping unit 121 is configured to subject the superimposed signal extracted by the first extraction unit 111 to waveform shaping. The second shaping unit 122 is configured to subject the superimposed signal extracted by the second extraction unit 112 to waveform shaping. The superimposing unit 13 includes a first superimposing unit 131 and a second superimposing unit 132. The first superimposing unit 131 is connected to the first terminal 101 and is configured to send the superimposed signal subjected to the shaping by the second shaping unit 122 to the first transmission path 21. The second superimposing unit 132 is connected to the second terminal 102 and is configured to send the superimposed signal subjected to the shaping by the first shaping unit 121 to the second transmission path 22. Additionally, the analyzing unit 19 includes a first analyzing unit 191 and a second analyzing unit 192. The first analyzing unit 191 is configured to analyze the state of the transmission signal on the first transmission path 21. The second analyzing unit 192 is configured to analyze the state of the transmission signal on the second transmission path 22. Moreover, the photocoupler 14 includes a first photocoupler 141 and a second photocoupler 142. The first photocoupler 141 is interposed between the first shaping unit 121 and the second superimposing unit 132. The second photocoupler 142 is interposed between the second shaping unit 122 and the first superimposing unit 131.

In other words, the first extraction unit 111, the first shaping unit 121, and the first superimposing unit 131 are provided on the primary side of the photocoupler 14, and the second extraction unit 112, the second shaping unit 122, and the second superimposing unit 132 are provided on the secondary side of the photocoupler 14. When the first transmission path 21 is designated as the relaying source and the second transmission path 22 is designated as the relaying destination, the superimposed signal is extracted from the first transmission path 21 by the first extraction unit 111 and is subjected to shaping by the first shaping unit 121 and subsequently is sent from the second superimposing unit 132 to the second transmission path 22 through the first photocoupler 141. In contrast, when the second transmission path 22 is designated as the relaying source and the first transmission path 21 is designated as the relaying destination, the superimposed signal is extracted from the second transmission path 22 by the second extraction unit 112 and is subjected to shaping by the second shaping unit 122 and subsequently is sent from the first superimposing unit 131 to the first transmission path 21 through the second photocoupler 142. As a result, the relay device 1 can perform bidirectional relaying including relaying the superimposed signal from the first transmission path 21 to the second transmission path 22 and relaying the superimposed signal from the second transmission path 22 to the first transmission path 21.

When the transmission signal passes through the relay 7, a delay may occur in the transmission signal. When the superimposed signal passes through the relay device 1, a delay may occur in the superimposed signal. The delay in the transmission signal and the delay in the superimposed signal may be different due to a difference between the frequencies of the transmission signal and the superimposed signal. Hence, when the superimposing unit 13 sends the superimposed signal to the transmission path 2 designated as the relaying destination as soon as receiving the superimposed signal from the shaping unit 12, the transmission signal may be deviated from the superimposed signal in a time axial direction on the relaying destination. In this case, the transmission signal and the superimposed signal fail to synchronize with each other, and therefore a communication error is likely to occur.

In the present embodiment, in consideration of the fact that sending the transmission signal is repeated periodically as mentioned above and each period includes the plural superimposable periods suitable for superimposition of the superimposed signal, the timing of sending the superimposed signal is determined as follows.

The superimposing unit 13 selects the superimposable period which coincides with the superimposable period in which the extraction unit 11 extracts the superimposed signal out of the superimposable periods of the transmission signals on the relaying source, from the superimposable periods of the transmission signals on the relaying destination. The superimposing unit 13 determines the timing of sending the superimposed signal such that the superimposed signal is sent within the selected superimposable period.

The following explanation is made to one example in which the superimposed signal is separately superimposed on the preliminary interrupt period 31, the preliminary period 32, and the transmission period 33 of the transmission signal on the transmission path 2 designated as the relaying source. In this case, the superimposing unit 13 determines the timing of sending the superimposed signal such that the superimposed signal is separately superimposed on the preliminary interrupt period 31, the preliminary period 32, and the transmission period 33 of the transmission signal on the transmission path 2 designated as the relaying destination in a similar manner as the destination source. Note that, the superimposable period in which the extraction unit 11 extracts the superimposed signal out of the superimposable periods of the transmission signals on the relaying source can be identified by analyzing the state of the transmission signal on the relaying source by the analyzing unit 19.

As shown in FIG. 1 (b), the relay device 1 of the present embodiment further includes a first switch 151 and a second switch 152. The first switch 151 is interposed between the first extraction unit 111 and the second superimposing unit 132. The second switch 152 is interposed between the second extraction unit 112 and the first superimposing unit 131. The first switch 151 is configured to open and close a connection between the first extraction unit 111 and the second superimposing unit 132. The first switch 151 determines whether or not the superimposed signal extracted by the first extraction unit 111 from the first transmission path 21 is relayed to the second transmission path 22. The second switch 152 is configured to open and close a connection between the second extraction unit 112 and the first superimposing unit 131. The second switch 152 determines whether or not the superimposed signal extracted by the second extraction unit 112 from the second transmission path 22 is relayed to the first transmission path 21.

Concretely, the first switch 151 is interposed between the first shaping unit 121 and the first photocoupler 141. When the first switch 151 is turned off, a path for the superimposed signal is opened between the first shaping unit 121 and the first photocoupler 141. The second switch 152 is interposed between the second shaping unit 122 and the second photocoupler 142. When the second switch 152 is turned off, a path for the superimposed signal is opened between the second shaping unit 122 and the second photocoupler 142.

In this embodiment, the first switch 151 is controlled to be turned off in response to reception of a first control signal mentioned below when the superimposed signal is relayed from the second transmission path 22 to the first transmission path 21 (i.e., when the second transmission path 22 is designated as the relaying source and the first transmission path 21 is designated as the relaying destination). In contrast, the second switch 152 is controlled to be turned off in response to reception of a second control signal mentioned below when the superimposed signal is relayed from the first transmission path 21 to the second transmission path 22 (i.e., when the first transmission path 21 is designated as the relaying source and the second transmission path 22 is designated as the relaying destination).

Accordingly, when the first transmission path 21 is designated as the relaying source and the second transmission path 22 is designated as the relaying destination, the superimposed signal is not allowed to be sent from the second extraction unit 112 to the first superimposing unit 131. Consequently, relaying the superimposed signal from the second transmission path 22 designated as the relaying destination to the first transmission path 21 designated as the relaying source is prohibited. Meanwhile, when the second transmission path 22 is designated as the relaying source and the first transmission path 21 is designated as the relaying destination, the superimposed signal is not allowed to be sent from the first extraction unit 111 to the second superimposing unit 132. Consequently, relaying the superimposed signal from the first transmission path 21 designated as the relaying destination to the second transmission path 22 designated as the relaying source is prohibited. Hence, with using the aforementioned relay device 1, it is possible to prevent feedback of the superimposed signal from the transmission path 2 designated as the relaying destination to the transmission path 2 designated as the relaying source.

Figure 4:
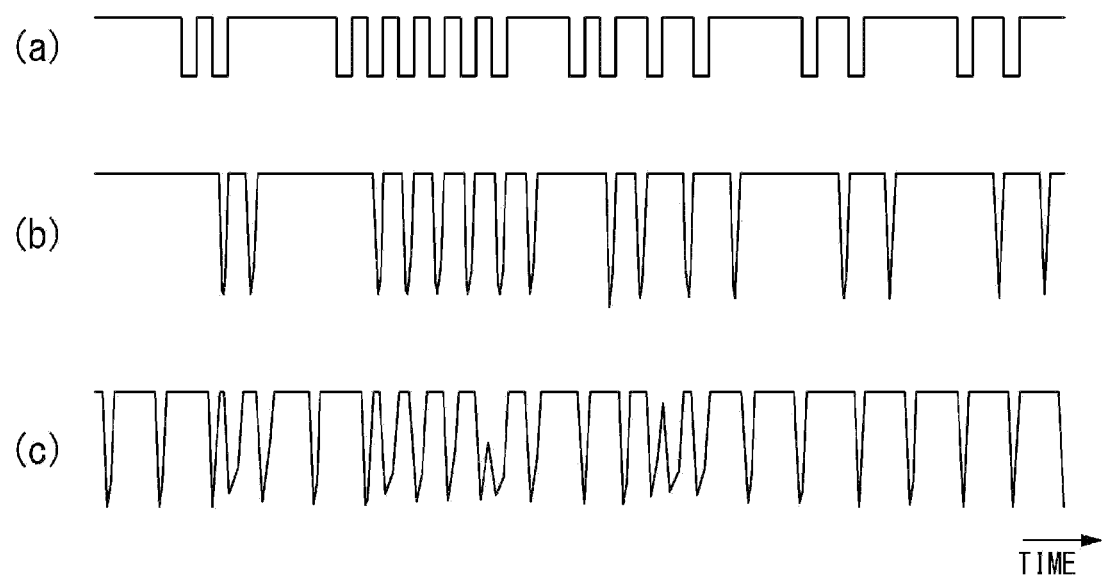
FIG. 4 is an explanation diagram illustrating an operation of the above.

The following explanation is made to an operation of the relay device 1 employing the above configuration with reference to an example where the second communication terminal 51 sends the superimposed signal having a rectangular wave shape shown in FIG. 4 (a). In this case, with regard to a relay device devoid of the first switch 151 and the second switch 152, the superimposed signal is fed back to the first transmission path 21 designated as the relaying source from the second transmission path 22 designated as the relaying destination. Hence, the superimposed signal presented on the first transmission path 21 has a waveform shown in FIG. 4 (c). In brief, the waveform of the superimposed signal is distorted due to an interference (overlap) between the waveforms of the superimposed signals. Therefore, the normal communication by use of the superimposed signal is likely to fail.

In contrast, the relay device 1 including the first switch 151 and the second switch 152 can prevent feedback of the superimposed signal from the transmission path 2 designated as the relaying destination to the transmission path 2 designated as the relaying source. Hence, the superimposed signal presented on the first transmission path 21 has a waveform shown in FIG. 4 (b). Therefore, the distortion of the waveform of the superimposed signal due to the interference between the superimposed signals is suppressed. Therefore, the normal communication by use of the superimposed signal is enabled.

Each of the first control signal and the second control signal is defined as a signal which is inputted from an outside of the relay device 1 and has two levels ("H" and "L" levels). The first switch 151 is turned on or off according as the first control signal has "H" level or "L" level, and the second switch 152 is turned on or off according as the second control signal has "H" level or "L" level. In the present embodiment, the first switch 151 is turned off while the first control signal has "H" level, and the second switch 152 is turned off while the second control signal has "H" level. In this regard, the first control signal and the second control signal are generated such that, as mentioned above, the first switch 151 is turned off while the superimposed signal is relayed from the second transmission path 22 to the first transmission path 21 and the second switch 152 is turned off while the superimposed signal is relayed from the first transmission path 21 to the second transmission path 22. In brief, the first control signal and the second control signal are generated according to the destination to which the relay device 1 relays the superimposed signal.

In the present embodiment, the second communication terminal (master) 51 connected to the first transmission path 21 sends the superimposed signal periodically to the second communication terminal (slave) 52 connected to the second transmission path 22 in a polling manner, and receives the superimposed signal from the second communication terminal 52 as a response to polling. Thus, it is possible to predict, based on the timing of polling by the second communication terminal 51, whether the relay device 1 relays the superimposed signal from the first transmission path 21 to the second transmission path 22 or relays the superimposed signal from the second transmission path 22 to the first transmission path 21. For example, another device (not shown) configured to generate the first control signal and the second control signal generates the first control signal and the second control signal based on the timing of polling by the second communication terminal 51, for example.

According to the relay device 1 of the present embodiment as described above, when the superimposed signal (second communication signal) is relayed from the second transmission path 22 to the first transmission path 21, the first switch 151 located between the first extraction unit 111 and the second superimposing unit 132 is turned off. Therefore, the relay device 1 can prevent the occurrence of a loop phenomenon in which the superimposed signal is relayed from the second transmission path 22 to the first transmission path 21 and is further returned to the second transmission path 22. Similarly, when the superimposed signal is relayed from the first transmission path 21 to the second transmission path 22, the second switch 152 located between the second extraction unit 112 and the first superimposing unit 131 is turned off. Therefore, the relay device 1 can prevent the occurrence of a loop phenomenon in which the superimposed signal relayed from the first transmission path 21 to the second transmission path 22 is further returned to the first transmission path 21.

In brief, according to the aforementioned relay device 1, the superimposed signal is not fed back from the transmission path 2 designated as the relaying destination to the transmission path 2 designated as the relaying source. Hence, it is possible to avoid the interference (overlap) between the superimposed signals at the primary side and the secondary side. Consequently, the relay device 1 of the present embodiment can relay the superimposed signal serving as the second communication signal without causing a distortion in the waveform thereof.

FIG. 1 (a) shows the communication system in which the first transmission path 21 and the second transmission path 22 are connected to each other through the relay 7 and the relay device 1. However, with using the plural relays 7 and the plural relay devices 1, the scale of the communication system can be enlarged. In brief, with using the plural relays 7 and the plural relay devices 1, it is possible to form the communication system in which the transmission path 2 is enlarged to have three or more sections. For example, it is possible to construct the communication system in which a third transmission path (not shown) is further connected to the second transmission path 22. In this case, the relay device 1 connected between the first transmission path 21 and the second transmission path 22 relays the superimposed signal between the first transmission path 21 and the second transmission path 22, and the relay device 1 connected between the second transmission path 22 and the third transmission path relays the superimposed signal between the second transmission path 22 and the third transmission path.

Note that, the present embodiment shows the communication system in which the second communication terminal 5 serving as the master communicates with the second communication terminal 5 serving as the slave in a polling manner. The preset embodiment is not limited to this configuration, and for example, the relay device 1 may be used in a communication system in conformity with an even-driven manner.

As described above, the relay device 1 is used in the communication system. The relay device 1 is interposed between the first transmission path 21 and the second transmission path 22 and is used. The relay device 1 is defined as the relay device 1 used in the communication system allowing communication by use of the first communication signal and the second communication signal superimposed on the first communication signal which are transmitted through the first transmission path 21 and the second transmission path 22.

The relay device 1 includes the first extraction unit 111, the first shaping unit 121, the second superimposing unit 132, the second extraction unit 112, the second shaping unit 122, and the first superimposing unit 131. The first extraction unit 111 is configured to extract the second communication signal from a signal transmitted through the first transmission path 21. The first shaping unit 121 is configured to subject the second communication signal extracted by the first extraction unit 111, to shaping. The second superimposing unit 132 is configured to superimpose the second communication signal subjected to shaping by the first shaping unit 121, on the first communication signal on the second transmission path 22, to send the second communication signal to the second transmission path 22. The second extraction unit 112 is configured to extract the second communication signal from a signal transmitted through the second transmission path 22. The second shaping unit 122 is configured to subject the second communication signal extracted by the second extraction unit 112, to shaping. The first superimposing unit 131 is configured to superimpose the second communication signal subjected to shaping by the second shaping unit 122, on the first communication signal on the first transmission path 21, to send the second communication signal to the first transmission path 21.

The relay device 1 includes the first switch 151 and the second switch 152. The first switch 151 is configured to open and close the connection between the first extraction unit 111 and the second superimposing unit 132. The second switch 152 is configured to open and close the connection between the second extraction unit 112 and the first superimposing unit 131. The first switch 151 is controlled by the first control signal to be turned off when the second communication signal is relayed from the second transmission path 22 to the first transmission path 21. The second switch 152 is controlled by the second control signal to be turned off when the second communication signal is relayed from the first transmission path 21 to the second transmission path 22.

Further, the relay device 1 includes the analyzing unit (analyzer). The analyzing unit is configured to analyze the state of the transmission signal on the first transmission path 21. The analyzing unit is configured to analyze the state of the transmission signal on the second transmission path 22.

In more detail, the relay device 1 includes first analyzing unit 191 and the second analyzing unit 192. The first analyzing unit 191 is configured to analyze the state of the transmission signal on the first transmission path 21. The second analyzing unit 192 is configured to analyze the state of the transmission signal on the second transmission path 22.

Furthermore, the first extraction unit 111 extracts the second communication signal transmitted through the first transmission path 21. The first analyzing unit 191 identifies the superimposable period by analyzing the first communication signal on the first transmission path 21.

Similarly, the second extraction unit 112 extracts the second communication signal transmitted through the second transmission path 22. The second analyzing unit 192 detects the superimposable period by analyzing the first communication signal on the second transmission path 22.

Moreover, the relay device 1 includes the first photocoupler 141 and the second photocoupler 142. The first photocoupler 141 is positioned between the first shaping unit 121 and the second superimposing unit 132. The second photocoupler 142 is positioned between the second shaping unit 122 and the first superimposing unit 131.

Additionally, the first extraction unit 111 is configured to extract the second communication signal transmitted through the first transmission path 21. The first superimposing unit 131 determines the timing of sending the second communication signal such that the second communication signal is sent in the superimposable period detected by the first analyzing unit 191.

Similarly, the second extraction unit 112 is configured to extract the second communication signal transmitted through the second transmission path 22. The second superimposing unit 132 determines the timing of sending the second communication signal such that the second communication signal is sent in the superimposable period identified by the second analyzing unit 192.

Second Embodiment

The relay device 1 of the present embodiment is different from the relay device 1 of the first embodiment in that the first control signal and the second control signal are created inside the relay device 1. In the following, components common to the present embodiment and the first embodiment are designated as the same reference numerals and explanations thereof are deemed unnecessary.

Figure 5:
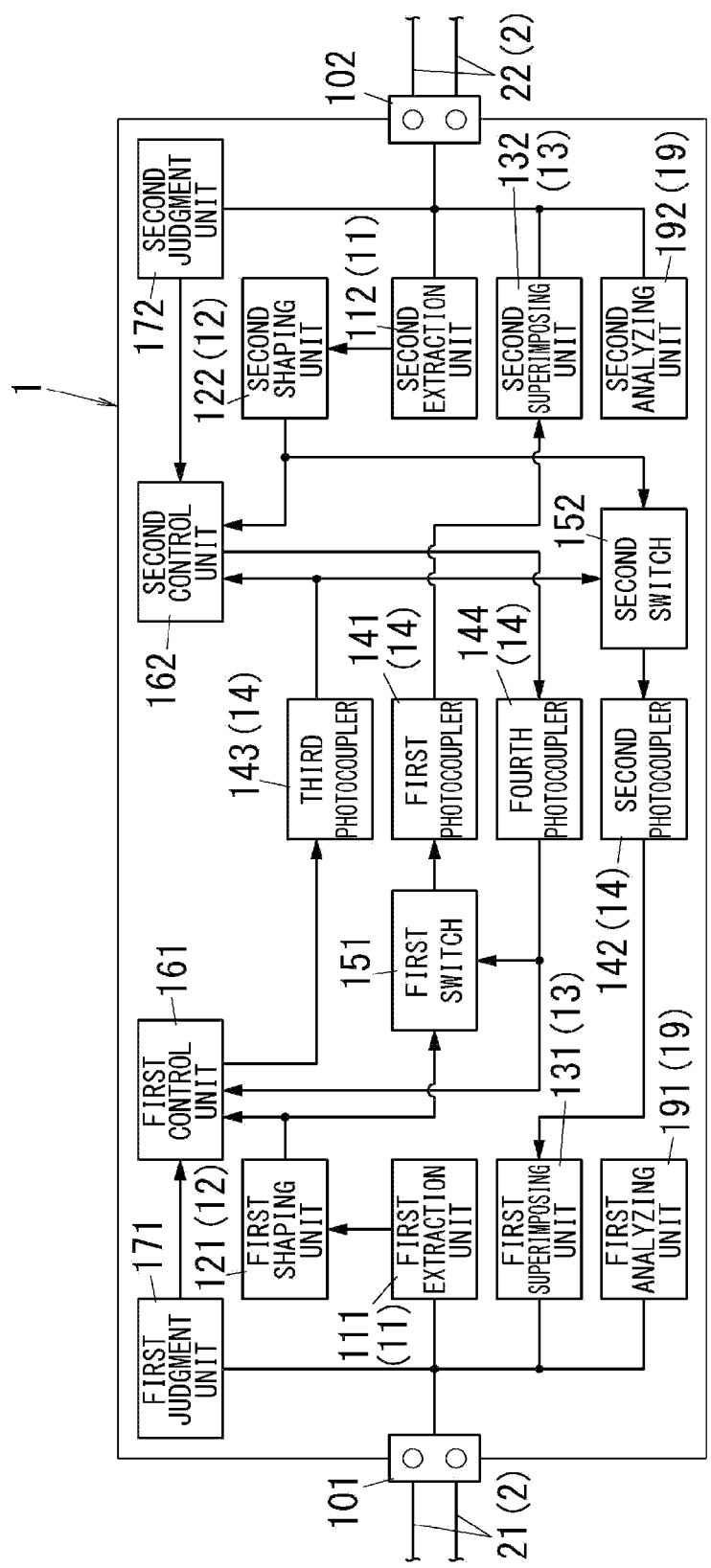
FIG. 5 is a schematic block diagram illustrating a configuration of the relay device of the second embodiment.

In the present embodiment, as shown in FIG. 5, the relay device 1 includes a first control unit (first control circuit) 161 and a second control unit (second control circuit) 162. The first control unit 161 is configured to generate the second control signal for turning on and off the second switch 152. The second control unit 162 generates the first control signal for turning on and off the first switch 151. The first control unit 161 is configured to generate the second control signal based on the superimposed signal (second communication signal) extracted by the first extraction unit 111. The second control unit 162 generates the first control signal based on the superimposed signal extracted by the second extraction unit 112.

In this regard, the photocouplers 14 are interposed between the first control unit 161 and the second switch 152 and between the second control unit 162 and the first switch 151, respectively. Hence, the primary side (the side close to the first transmission path 21) and the secondary side (the side close to the second transmission path 22) are electrically insulated. The first control unit 161 is connected to the primary side of a third photocoupler 143, and the second control unit 162 is connected to the secondary side of a fourth photocoupler 144. In other words, the second control signal generated by the first control unit 161 is outputted to the second switch 152 by way of the third photocoupler 143, and the first control signal generated by the second control unit 162 is outputted to the first switch 151 by way of the third photocoupler 143.

In the present embodiment, the first control unit 161 is connected to an output terminal of the first shaping unit 121. The first control unit 161 changes the second control signal to the "H" level in response to a trigger defined by a variation (a rising edge or a falling edge) in the second communication signal subjected to shaping by the first shaping unit 121. In brief, when the superimposed signal is relayed from the first transmission path 21 to the second transmission path 22, the first control unit 161 changes the second control signal to the "H" level, thereby turning off the second switch 152. Meanwhile, the second control unit 162 is connected to an output terminal of the second shaping unit 122. The second control unit 162 changes the first control signal to the "H" level in response to a trigger defined by a variation (a rising edge or a falling edge) in the superimposed signal subjected to shaping by the second shaping unit 122. In brief, when the superimposed signal is relayed from the second transmission path 22 to the first transmission path 21, the second control unit 162 changes the first control signal to the "H" level, thereby turning off the first switch 151.

Figure 6:
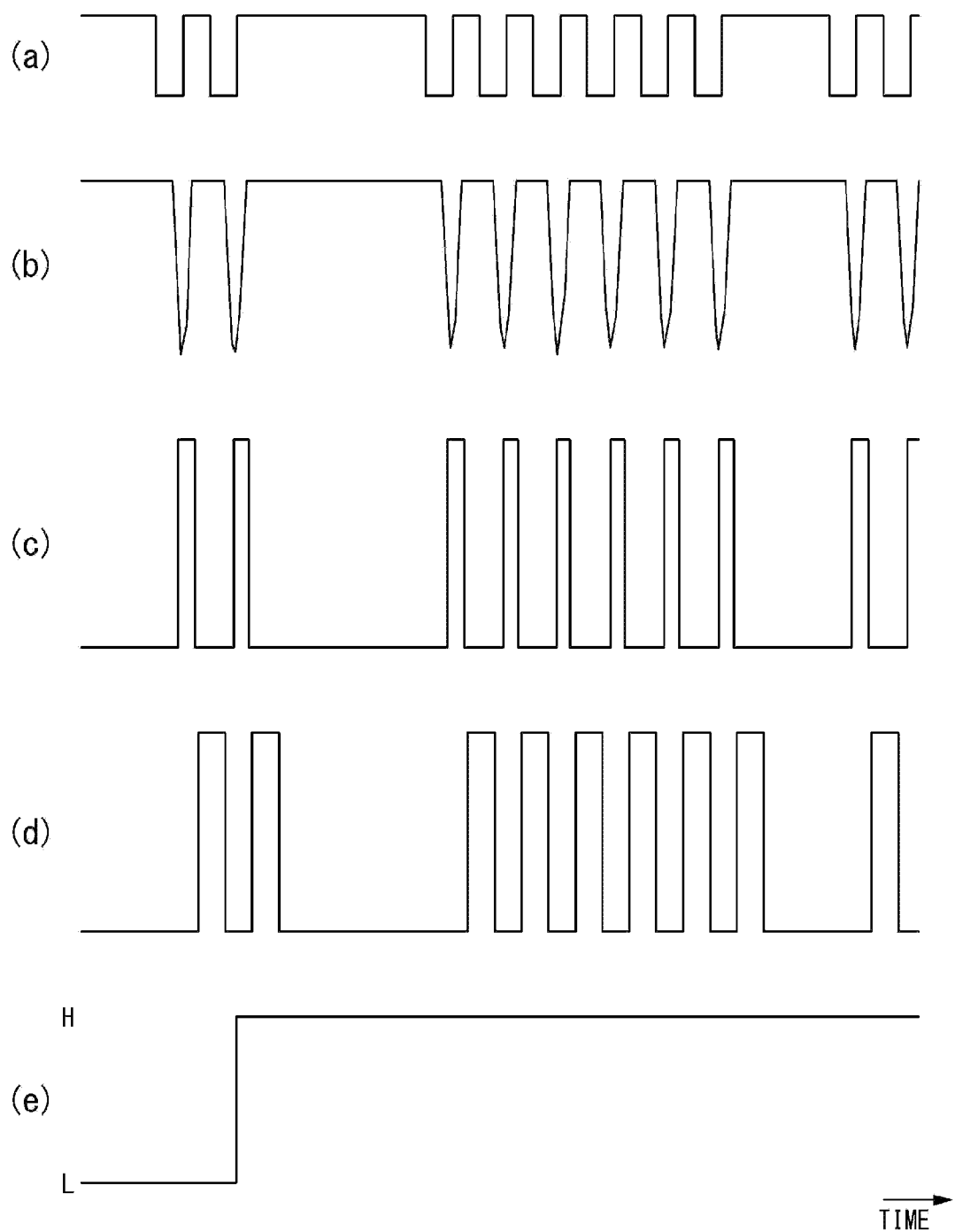
FIG. 6 is an explanation diagram illustrating an operation of the above.

The following explanation is made to an operation of the relay device 1 employing the above configuration with reference to an example where the second communication terminal 51 sends the superimposed signal having a rectangular wave shape shown in FIG. 6 (a). In FIG. 6, (b) shows the superimposed signal provided to the first transmission path 21, (c) shows an output from the first extraction unit 111, (d) shows an output from the first shaping unit 121, and (e) shows the second control signal. Note that, in this instance, the superimposed signal is inverted at the extraction unit 111. However, such inversion is not always necessary.

In this case, the superimposed signal (see FIG. 6 (d)) delayed by a predetermined time delay relative to the superimposed signal (see FIG. 6 (a)) from the second communication terminal 51 is inputted into the first control unit 161 from the first shaping unit 121. The first control unit 161 monitors the superimposed signal inputted from the first shaping unit 121. The first control unit 161 acknowledges the rising edge of this superimposed signal as a trigger, and changes the second control signal (see FIG. 6 (e)) from the "L" level to the "H" level in response to the trigger. In this embodiment, the first control unit 161 changes the second control signal to the "H" level after the passage of a predetermined delay from the time at the rising edge of the superimposed signal. Thereafter, when the superimposed signal inputted from the first shaping unit 121 is kept unchanged over a predetermined time period, the first control unit 161 changes the second control signal to the "L" level.

Note that, the second control unit 162 acknowledges the rising edge of the superimposed signal inputted from the second shaping unit 122 as a trigger, and changes the first control signal from the "L" level to the "H" level in response to the trigger, in a similar manner as mentioned above.

Further, the relay device 1 of the present embodiment further includes a first judgment unit (first judgment circuit) 171 and a second judgment unit (second judgment circuit) 172. The first judgment unit 171 is configured to extract the transmission signal (first communication signal) from a signal transmitted through the first transmission path 21 and judge whether or not a current period is the superimposable period. The second judgment unit 172 is configured to extract the transmission signal from a signal transmitted through the second transmission path 22 and judge whether or not the current period is the superimposable period. Note that, the analysis of the state of the transmission signal may be performed by the first analyzing unit 191 and the second analyzing unit 192. In this case, the first judgment unit 171 and the second judgment unit 172 may be configured to receive the analysis results from the first analyzing unit 191 and the second analyzing unit 192 and to judge whether or not the current period is the superimposable period, respectively.

The first control unit 161 is configured to, only while the current period is determined to be the superimposable period by the first judgment unit 171, change the second control signal to the "H" level based on the superimposed signal extracted by the first extraction unit 111 so as to turn off the second switch 152. In other words, the first control unit 161 receives the superimposed signal from the first shaping unit 121 as well as a primary permission signal which is produced while the first judgment unit 171 determines the current period is the superimposable period, and generates the second control signal according to these two signals. Hence, in a period which is determined to be the unsuperimposable period by the first judgment unit 171, the first control unit 161 keeps the second control signal at the "L" level irrespective of the condition of the superimposed signal, thereby keeping turning on the second switch 152.

The second control unit 162 is configured to, only while the current period is determined to be the superimposable period by the second judgment unit 172, change the first control signal to the "H" level based on the superimposed signal extracted by the second extraction unit 112 so as to turn off the first switch 151. In other words, the second control unit 162 receives the superimposed signal from the second shaping unit 122 as well as a secondary permission signal which is produced while the second judgment unit 172 determines the current period is the superimposable period, and generates the first control signal according to these two signals. Hence, in a period which is determined to be the unsuperimposable period by the second judgment unit 172, the second control unit 162 keeps the first control signal at the "L" level irrespective of the condition of the superimposed signal, thereby keeping turning on the first switch 151.

Figure 7:
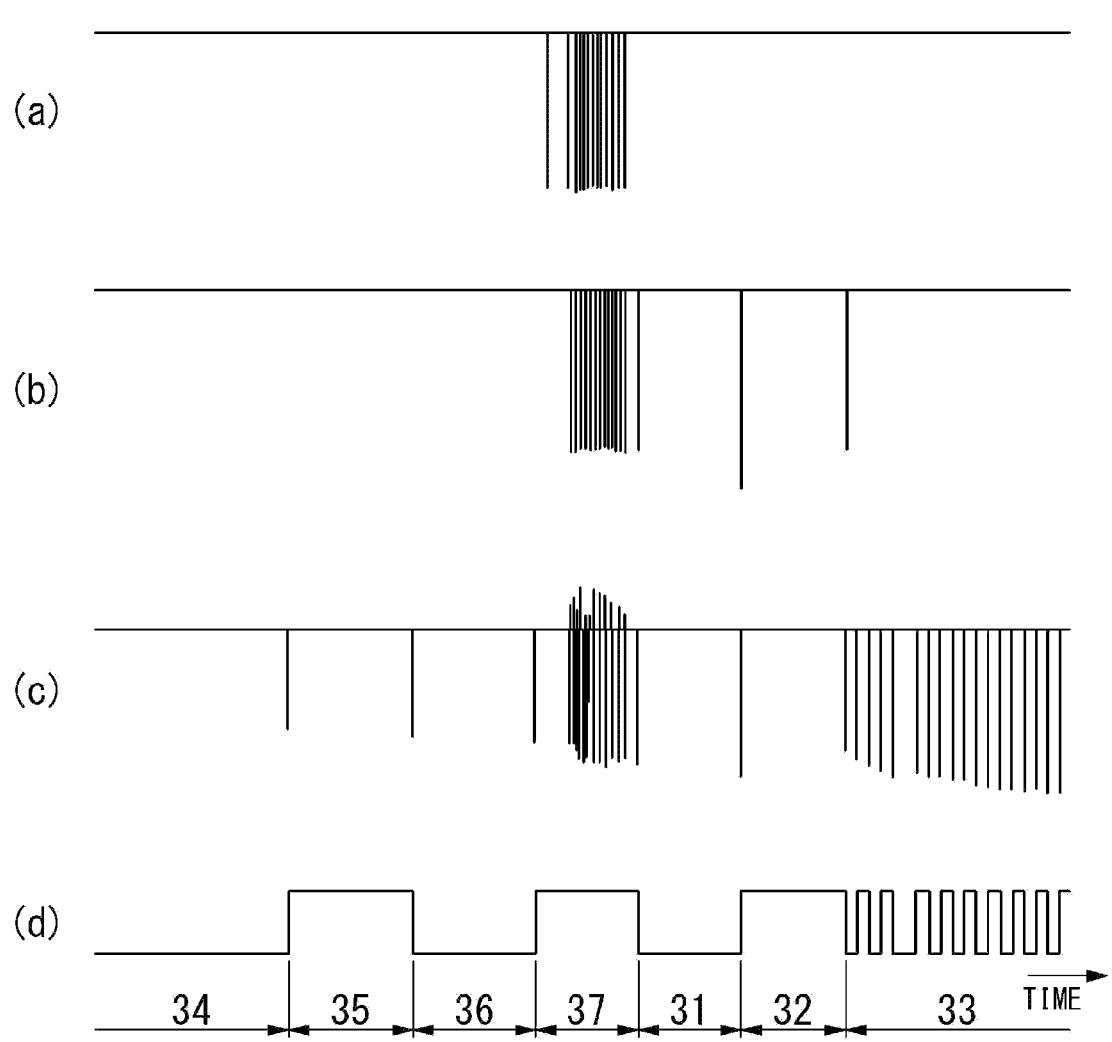
FIG. 7 is an explanation diagram illustrating an operation of the above.

The following explanation is made to an operation of the relay device 1 employing the above configuration with reference to an example where the second communication terminal 51 sends the superimposed signal having a rectangular wave shape shown in FIG. 7 (a). In FIG. 7, (b) shows the superimposed signal provided to the first transmission path 21, (c) shows the output from the first extraction unit 111, and (d) shows the transmission signal on the first transmission path 21. Note that, the transmission signal illustrated in FIG.

7 (*d*) is inverted relative to the transmission signal illustrated in FIG. 3. However, this is caused by a difference between measurement methods, but these transmission signals have the same signal format.

In this case, when receiving the primary permission signal from the first judgment unit 171 and detecting the variation in the superimposed signal (see FIG. 7 (*c*)) outputted from the first extraction unit 111, the first control unit 161 changes the second control signal from the "L" level to the "H" level. In brief, only when the transmission signal (see FIG. 7 (*d*)) on the first transmission path 21 provides the superimposable period (the preliminary interrupt period 31, the preliminary period 32, and the rest period 37), the first control unit 161 acknowledges the variation in the superimposed signal inputted from the first shaping unit 121 as the trigger, and changes the second control signal to the "H" level in response to the trigger.

Note that, similarly, only when the transmission signal on the second transmission path 22 provides the superimposable period, the second control unit 162 acknowledges the variation in the superimposed signal inputted from the second shaping unit 122 as the trigger, and changes the first control signal from the "L" level to the "H" level in response to the trigger.

According to the above configuration, only when the transmission signal on the relaying source provides the superimposable period, the first control unit 161 and the second control unit 162 turn off the first switch 151 and the second switch 152, respectively. Therefore, it is possible to prevent these switches from being turned off due to noises picked up by the extraction unit 11. In brief, even if noises are contained in the superimposed signal outputted from the extraction unit 11 as shown in FIG. 7 (*c*), it is possible to prevent that these noises are acknowledged to be the trigger and then the first switch 151 or the second switch 152 is turned off.

In the present embodiment, the second communication terminal (master) 51 connected to the first transmission path 21 sends the superimposed signal periodically to the second communication terminal (slave) 52 connected to the second transmission path 22 in a polling manner, and receives the superimposed signal from the second communication terminal 52 as a response to polling. Accordingly, the second communication terminal 51 on the side of the first transmission path 21 and the second communication terminal 52 on the side of the second transmission path 22 performs communication using the superimposed signal in turns, and do not send the superimposed signal simultaneously. In consideration of this, in the present embodiment, the first control unit 161 is configured to turn off the second switch 152 only while the first switch 151 is turned on, and the second control unit 162 is configured to turn off the first switch 151 only while the second switch 152 is turned on.

Concretely, while the first control signal has the "L" level, the first control unit 161 changes the second control signal to the "H" level according to the superimposed signal extracted by the first extraction unit 111 to turn off the second switch 152. For example, the first control unit 161 receives the first control signal outputted from the second control unit 162 through the fourth photocoupler 144, and generates the second control signal according to the superimposed signal from the first shaping unit 121, the primary permission signal, and the first control signal. Hence, in a period in which the first control signal has the "H" level, the first control unit 161 keeps the second control signal at the "L" level irrespective of the condition of the superimposed signal to keep the second switch 152 turned on.

While the second control signal has the "L" level, the second control unit 162 changes the first control signal to the "H" level according to the superimposed signal extracted by the second extraction unit 112 to turn off the first switch 151. For example, the second control unit 162 receives the second control signal outputted from the first control unit 161 through the third photocoupler 143, and generates the first control signal according to the superimposed signal from the second shaping unit 122, the secondary permission signal, and the second control signal. Hence, in a period in which the second control signal has the "H" level, the second control unit 162 keeps the first control signal at the "L" level irrespective of the condition of the superimposed signal to keep the first switch 151 turned on.

Figure 8:
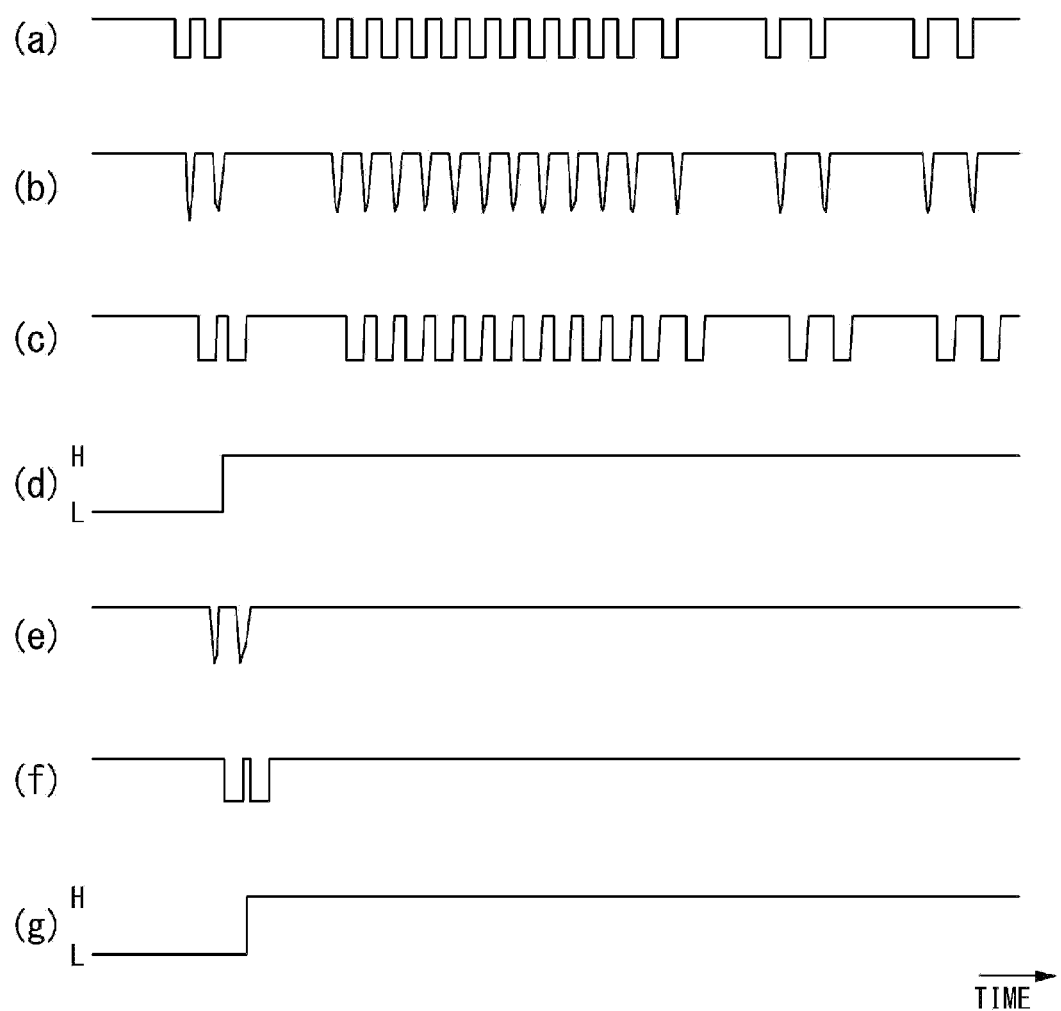
FIG. 8 is an explanation diagram illustrating an operation of the above.
Figure 9:
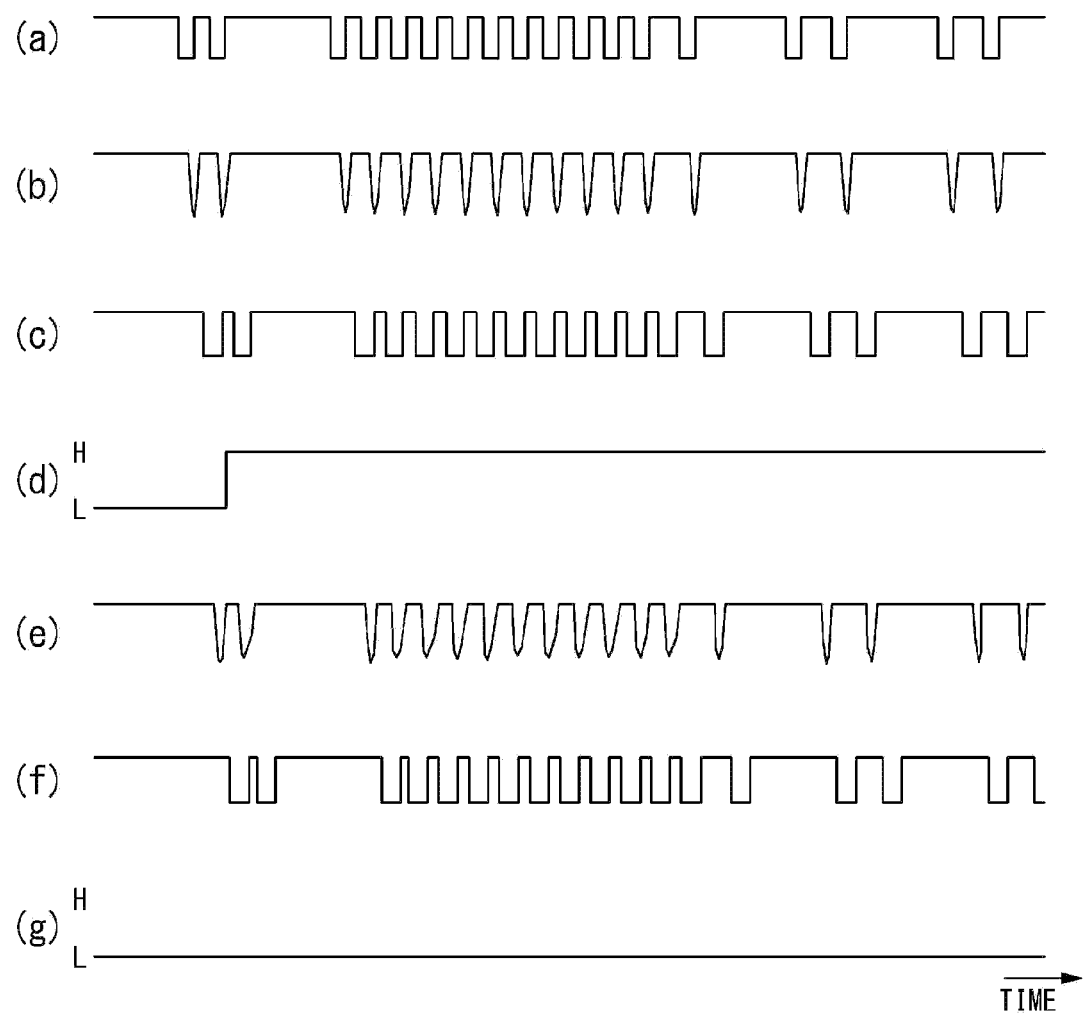
FIG. 9 is an explanation diagram illustrating an operation of the above.

The following explanation is made to an operation of the relay device 1 employing the above configuration with reference to an example where the second communication terminal 51 sends the superimposed signal shown in FIG. 8 (*a*) and FIG. 9 (*a*). In FIG. 8 and FIG. 9, (*b*) shows the superimposed signal on the first transmission path 21, (*c*) shows an output from the first shaping unit 121, (*d*) shows the second control signal, (*e*) shows the superimposed signal on the second transmission path 22, (*f*) shows an output from the second shaping unit 122, and (*g*) shows the first control signal.

In this case, with regard to the relay device in which the first control unit 161 receives no first control signal and the second control unit 162 receives no second control signal, the second switch 152 and the first switch 151 are likely to be turned off during the same period, and thus the relay device may fail to relay the superimposed signal (see the instance shown in FIG. 8). In detail, after the first control unit 161 acknowledges the output from the first shaping unit 121 (see FIG. 8 (*c*)) as the trigger, and turns off the second switch 152 by the second control signal (see FIG. 8 (*d*)) in response to the trigger, the superimposed signal (see FIG. 8 (*e*)) is relayed from the secondary side to the primary side through the first switch 151 and is present on the second transmission path 22. In this case, the second control unit 162 may acknowledge the output from the second shaping unit 122 (see FIG. 8 (*f*)) as the trigger, and turn off the first switch 151 by the first control signal (see FIG. 8 (*g*)) in response to the trigger. In short, signals for turning off the first switch 151 and the second switch 152 are generated on the primary side and the secondary side, respectively. Thus, relaying the superimposed signal from the primary side to the secondary side and relaying the superimposed signal from the secondary side to the primary side are interrupted. As a result, as shown in FIG. 8 (*e*), although first some bits (two bits, in the shown instance) of the superimposed signal is relayed from the first transmission path 21 to the second transmission path 22, the remaining bits of the superimposed signal is not relayed.

In contrast, with regard to the relay device 1 of the present embodiment in which the first control unit 161 receives the first control signal and the second control unit 162 receives the second control signal, the second switch 152 and the first switch 151 are not turned off during the same period (see the instance shown in FIG. 9). So long as the second switch 152 is kept turned off, even if the superimposed signal (see FIG. 9 (*e*)) relayed from the primary side to the secondary side through the first switch 151 is present on the second transmission path 22, the second control unit 162 does not turn off the first switch 151 by the first control signal (see FIG. 9 (*g*). In short, the path for the superimposed signal from the primary side as the relaying source to the secondary side as the relaying destination is not opened, but only the path for the superimposed signal from the secondary side to the primary side is opened. Consequently, as shown in FIG. 9 (*e*), it is possible to prevent a loop phenomenon in which the superimposed signal is relayed from the first transmission path 21 to the second transmission path 22 and is further returned to the first transmission path 21.

Note that, similarly, when the superimposed signal is relayed from the second transmission path 22 to the first transmission path 21, the path for the superimposed signal from the relaying source to the relaying destination is not opened, but only the path for the superimposed signal from the relaying destination to the relaying source is opened.

According to the above configuration, the relay device 1 can relay the superimposed signal to the transmission path 2 as the relaying source to the transmission path 2 as the relaying destination yet preventing the feedback of the superimposed signal from the relaying destination to the relaying source. Consequently, it is possible to relay the superimposed signal defined by the second communication signal, without causing a distortion in the waveform thereof.

According to the relay device 1 of the present embodiment as described above, the relay device 1 is provided with the first control unit 161 configured to generate the second control signal and the second control unit 162 configured to generate the first control signal. Hence, it is possible to prevent the feedback of the superimposed signal from the relaying destination to the relaying source without using external signals. Accordingly, the first control unit 161 is configured to generate the second control signal according to the superimposed signal extracted by the first extraction unit 111, and the second control unit 162 is configured to generate the first control signal according to the superimposed signal extracted by the second extraction unit 112. Thus, the first control signal and the second control signal can be generated without using external signals.

Figure 10:
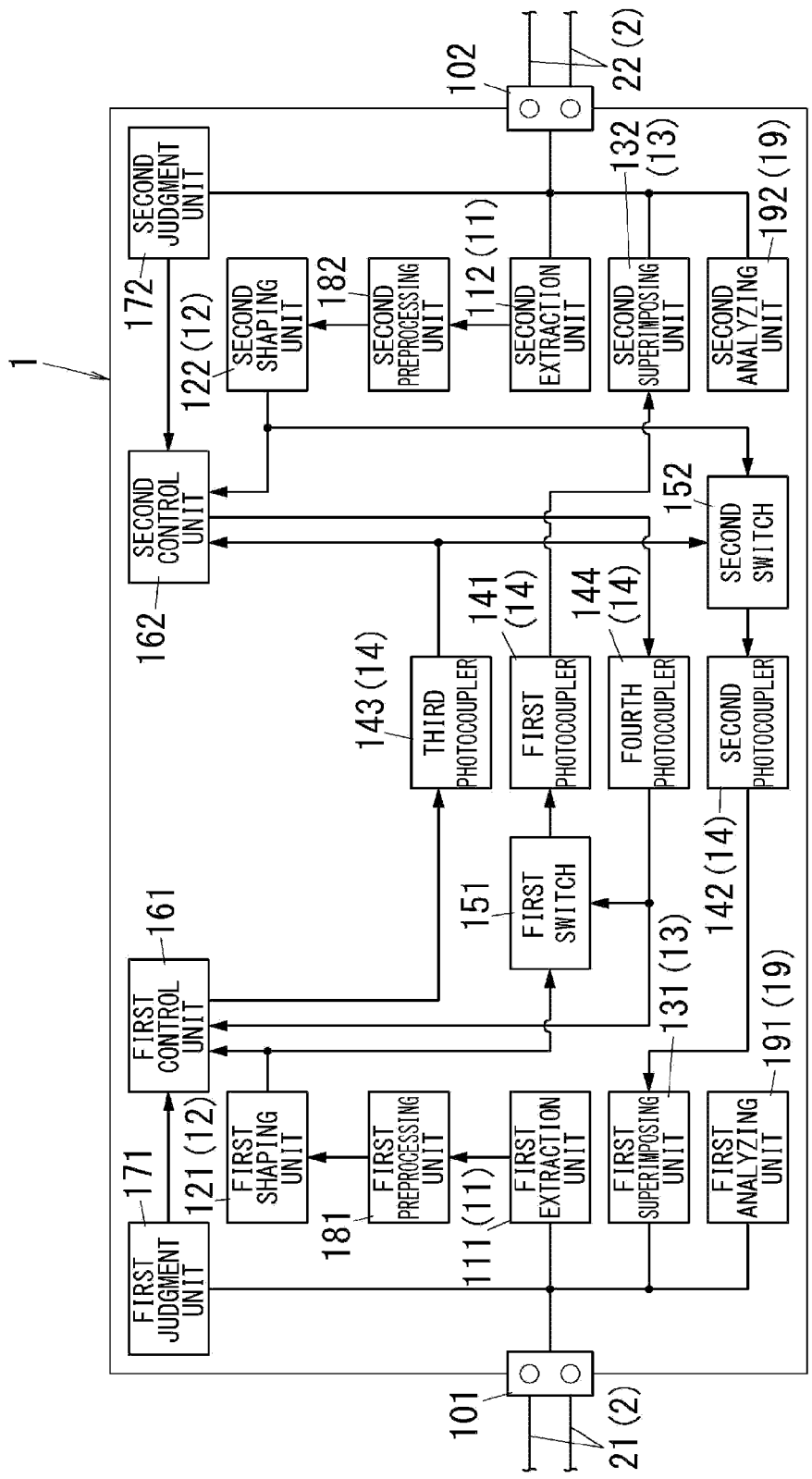
FIG. 10 is a schematic block diagram illustrating another configuration of the above relay device.

In another modification of the present embodiment, as shown in FIG. 10, the relay device 1 may be provided with a first preprocessing unit (first preprocessing circuit) 181 and a second preprocessing unit (second preprocessing circuit) 182. The first preprocessing unit 181 is interposed between the first extraction unit 111 and the first control unit 161 and is configured to subject the superimposed signal to shaping. The second preprocessing unit 182 is interposed between the second extraction unit 112 and the second control unit 162 and is configured to subject the superimposed signal to shaping. In this modification, the shaping unit 12 has a function of correcting a duration, and the first preprocessing unit 181 is provided to an input side of the first shaping unit 121, and the second preprocessing unit 182 is provided to an input side of the second shaping unit 122. Each of the first preprocessing unit 181 and the second preprocessing unit 182 performs waveform shaping on the superimposed signal such that the superimposed signal has sufficient amplitude, by use of amplifiers and/or comparators, before the superimposed signal is inputted into the shaping unit 12.

According to this configuration, the first control unit 161 and the second control unit 162 generate the second control signal and the first control signal according to the superimposed signals which have been subjected to shaping by the first preprocessing unit 181 and the second preprocessing unit 182, respectively. Thus, it is possible to prevent that the first switch 151 or the second switch 152 is accidentally turned off (or on) due to a shortage of the amplitude or a distortion in the waveform of the superimposed signal inputted into the first control unit 161 or the second control unit 162.

Further, each of the first preprocessing unit 181 and the second preprocessing unit 182 includes a pulse generator (not shown) configured to generate a pulse signal with fixed pulse width in response to reception of the superimposed signal. For example, each of the first preprocessing unit 181 and the second preprocessing unit 182 performs waveform shaping by use of a one shot timer. Each of the first preprocessing unit 181 and the second preprocessing unit 182 outputs a pulse signal with a fixed pulse width in response to a trigger defined by a variation (a rising edge and a falling edge) in the inputted superimposed signal.

Figure 11:
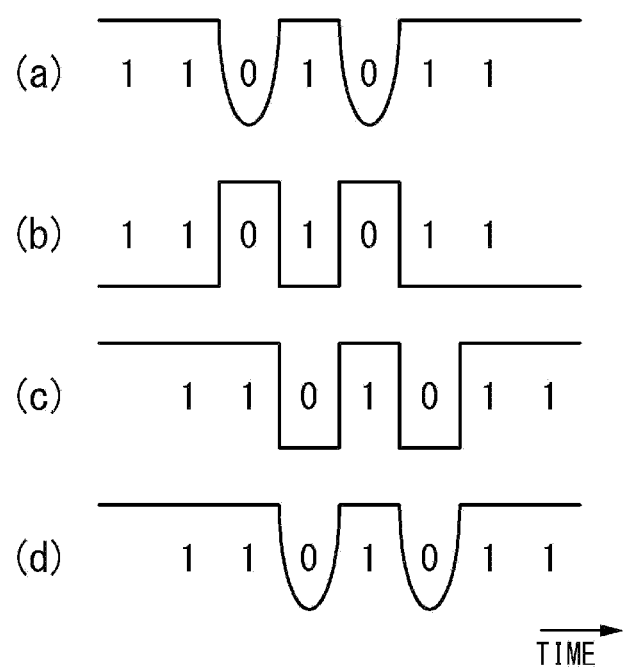
FIG. 11 is an explanation diagram illustrating an operation of the above.

For example, when the superimposed signal shown in FIG. 11 (*a*) is present on the first transmission path 21, the first preprocessing unit 181 outputs the superimposed signal which has been subjected to waveform shaping by amplifiers and comparators, as shown in FIG. 11 (*b*). When the falling edge of this signal is selected as the trigger, the one shot timer generates the pulse signal with the fixed pulse width shown in FIG. 11 (*c*), and the first shaping unit 121 outputs the superimposed signal which has been subjected to shaping and is delayed by one bit relative to the superimposed signal inputted into the first shaping unit 121. Consequently, the superimposed signal shown in FIG. 11 (*d*) is present on the second transmission path 22 designated as the relaying destination. Note that, in this case, the superimposed signal is inverted at the first preprocessing unit 181 and the first shaping unit 121. However, such inversion is not always necessary.

According to this configuration, delays of the superimposed signals relayed by the relay device 1 can be substantially equal to one bit of the superimposed signal. For example, when one bit is 6.4 µs, and when delays caused by the photocoupler 14 and the superimposing unit 13 are ignored, the delay of the superimposed signal is 6.4 µs theoretically. Consequently, the relay device 1 can perform shaping on the superimposed signal at relatively short time, and generate the first control signal and the second control signal according to this superimposed signal.

As described in the above, the relay device 1 illustrated in FIG. 1 includes the first preprocessing unit 181 and the second preprocessing unit 182. The first preprocessing unit 181 is interposed between the first extraction unit 111 and the first control unit. The second preprocessing unit 182 is interposed between the second extraction unit 112 and the second control unit.

Further, the first preprocessing unit 181 is configured to generate the pulse signal with the fixed pulse width in response to the trigger defined by the variation in the second communication signal.

Further, the second preprocessing unit 182 is configured to generate the pulse signal with the fixed pulse width in response to the trigger defined by the variation in the second communication signal.

The other configurations and functions of the present embodiment are same as those of the first embodiment.

REFERENCE SIGNS LIST 1 relay device
2 transmission path
21 first transmission path
22 second transmission path
111 first extraction unit
112 second extraction unit
121 first shaping unit
122 second shaping unit
131 first superimposing unit
132 second superimposing unit
151 first switch
152 second switch
161 first control unit
162 second control unit 171 first judgment unit
172 second judgment unit
181 first preprocessing unit
182 second preprocessing unit

The invention claimed is:

1. A relay device which is interposed between a first transmission path and a second transmission path and is used in a communication system allowing communication by use of a first communication signal and a second communication signal superimposed on the first communication signal which are transmitted through the first transmission path and the second transmission path, the relay device comprising:
   a first extraction unit configured to extract the second communication signal from a signal transmitted through the first transmission path;
   a first shaping unit configured to subject the second communication signal extracted by the first extraction unit, to shaping;
   a second superimposing unit configured to superimpose the second communication signal subjected to shaping by the first shaping unit, on the first communication signal on the second transmission path, to send the second communication signal to the second transmission path;
   a second extraction unit configured to extract the second communication signal from a signal transmitted through the second transmission path;
   a second shaping unit configured to subject the second communication signal extracted by the second extraction unit, to shaping;
   a first superimposing unit configured to superimpose the second communication signal subjected to shaping by the second shaping unit, on the first communication signal on the first transmission path, to send the second communication signal to the first transmission path;
   wherein:
   the relay device further comprises:
      a first switch configured to open and close a connection between the first extraction unit and the second superimposing unit; and
      a second switch configured to open and close a connection between the second extraction unit and the first superimposing unit,
   the first switch is controlled by a first control signal to be turned off when the second communication signal is relayed from the second transmission path to the first transmission path, and
   the second switch is controlled by a second control signal to be turned off when the second communication signal is relayed from the first transmission path to the second transmission path, and wherein:
the relay device further comprises:
   a first control unit configured to generate the second control signal according to on the second communication signal extracted by the first extraction unit; and
   a second control unit configured to generate the first control signal according to the second communication signal extracted by the second extraction unit.

2. The relay device as set forth in claim 1, wherein:
the relay device further comprises:
   a first judgment unit configured to extract the first communication signal from a signal transmitted through the first transmission path and judge whether or not a current period is a superimposable period in which the second communication signal is allowed to be superimposed; and
   a second judgment unit configured to extract the first communication signal from a signal transmitted through the second transmission path and judge whether or not the current period is the superimposable period in which the second communication signal is allowed to be superimposed,
the first control unit is configured to turn off the second switch by the second control signal only while the current period is determined to be the superimposable period by the first judgment unit, and
the second control unit is configured to turn off the first switch by the first control signal only while the current period is determined to be the superimposable period by the second judgment unit.

3. The relay device as set forth in claim 1, wherein:
the first control unit is configured to turn off the second switch by the second control signal only while the first switch is turned on; and
the second control unit is configured to turn off the first switch by the first control signal only while the second switch is turned on.

4. The relay device as set forth in claim 1, wherein:
the relay device further comprises:
   a first preprocessing unit interposed between the first extraction unit and the first control unit and configured to subject the second communication signal to shaping; and
   a second preprocessing unit interposed between the second extraction unit and the second control unit and configured to subject the second communication signal to shaping.

5. The relay device as set forth in claim 4, wherein:
each of the first preprocessing unit and the second preprocessing unit is configured to generate a pulse signal with a fixed pulse width in response to a trigger defined by a variation in the second communication signal.

* * * * *